Nov. 5, 1940.   A. I. KIRKLAND   2,220,654
CHUCK
Filed June 7, 1939   2 Sheets-Sheet 2
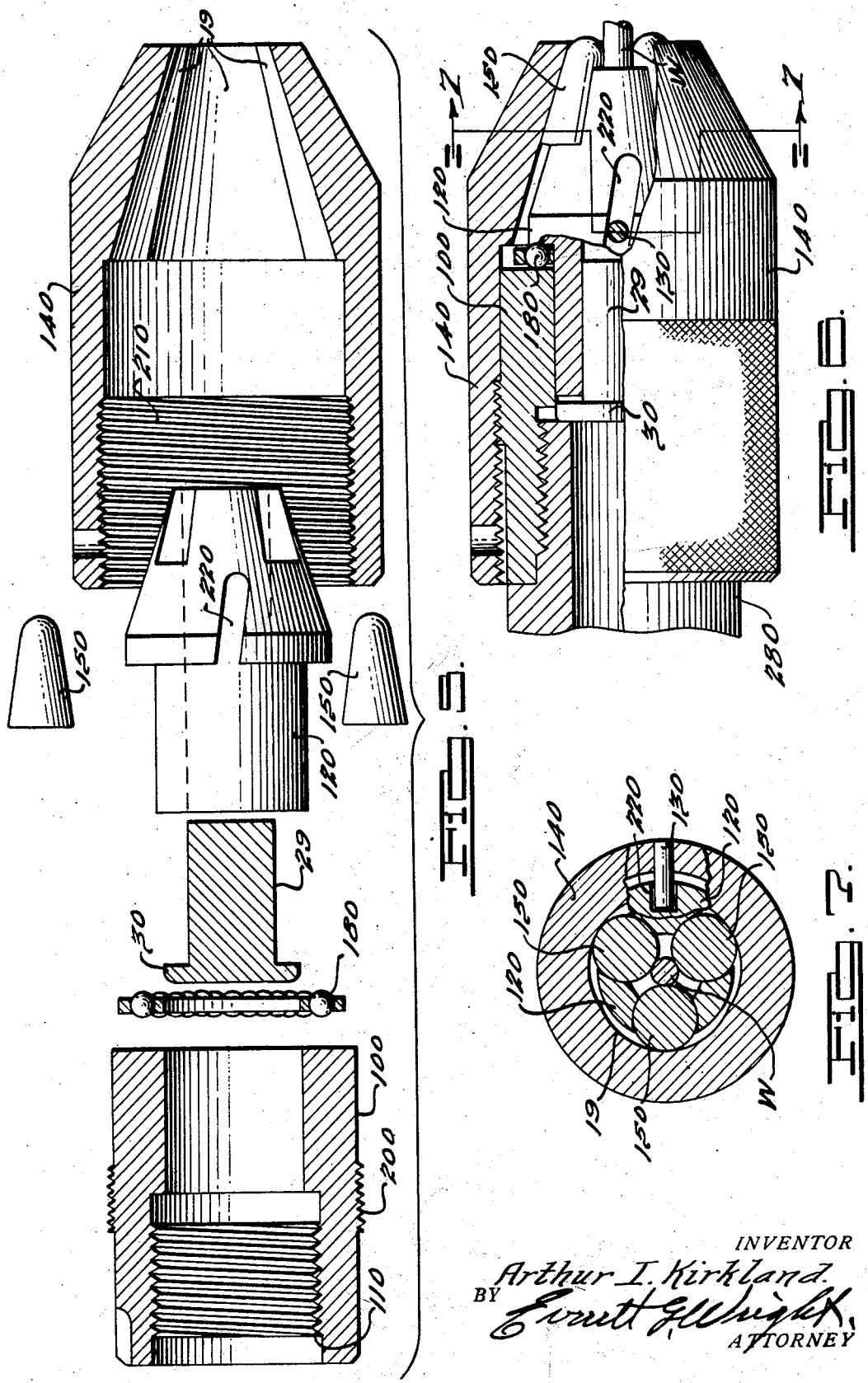
INVENTOR
Arthur I. Kirkland.
BY
ATTORNEY Patented Nov. 5, 1940

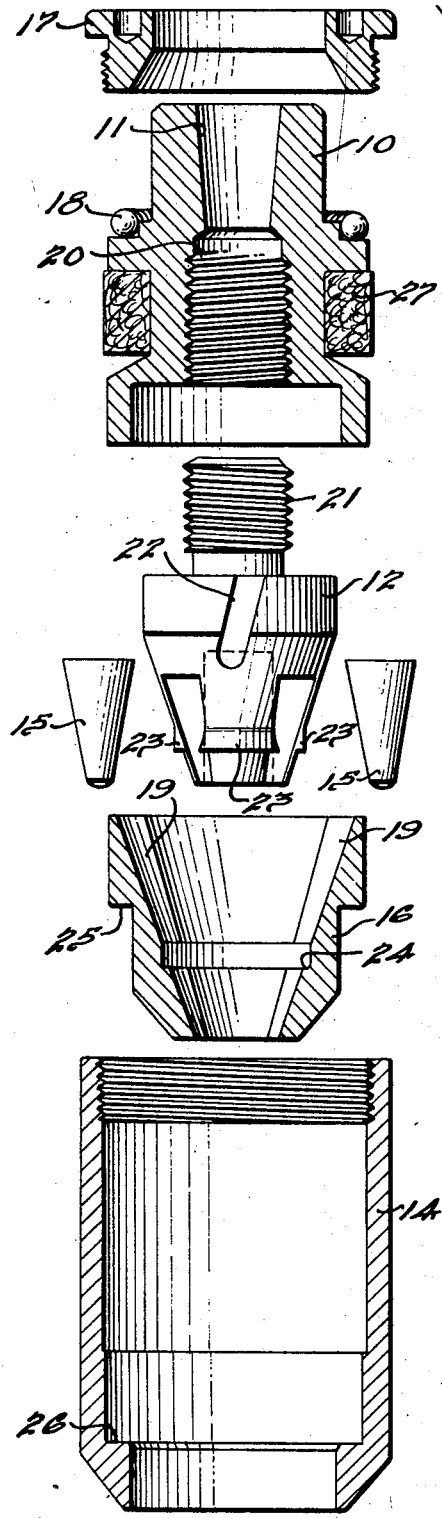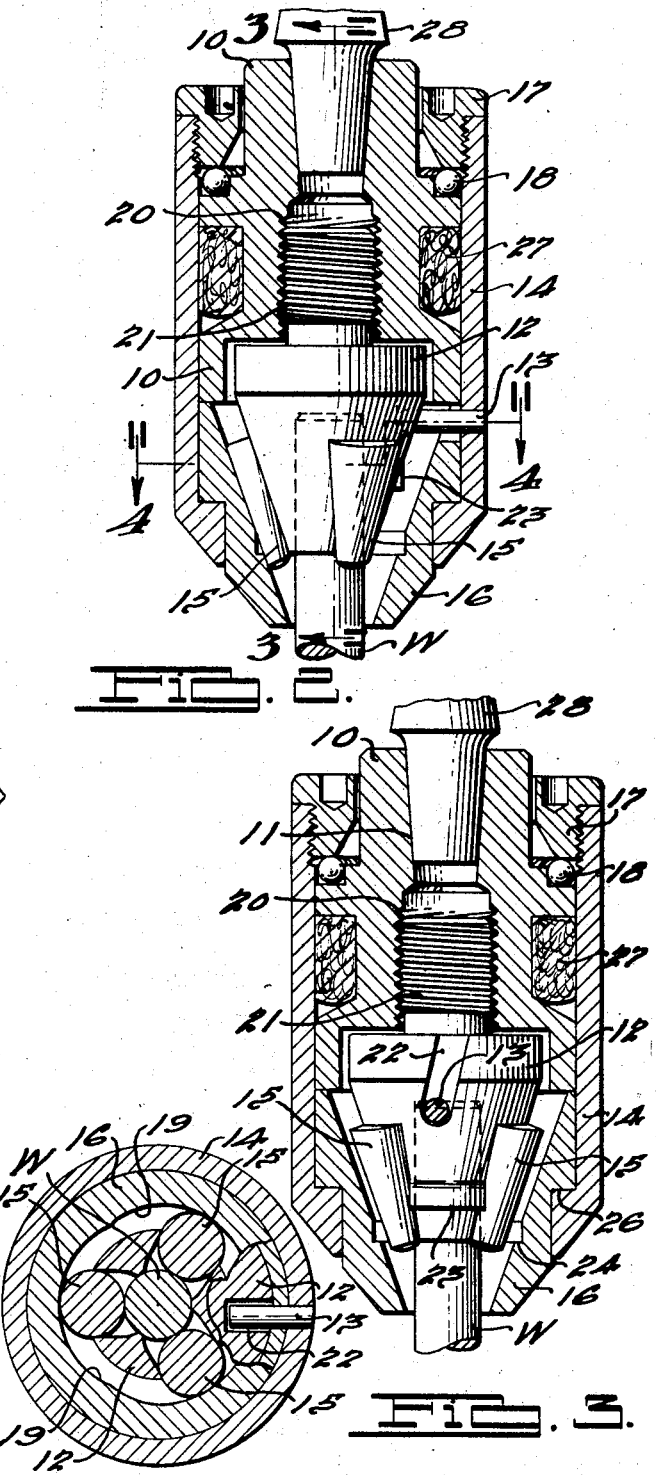

2,220,654

UNITED STATES PATENT OFFICE 2,220,654

CHUCK

Arthur I. Kirkland, Detroit, Mich.

Application June 7, 1939, Serial No. 277,871

11 Claims. (Cl. 279—60)

This invention relates to chucks and more especially to chucks which are self-energizing in their work gripping action and adapted to operate drills, counterbores, reamers and similar work tools. In certain respects, the present invention is an improvement upon and/or is related to the invention disclosed in my prior U. S. Patent No. 2,069,527 issued February 2, 1937, for Chucks adapted for stud driver or the like.

The principal object of the invention is to improve the art of self-energizing chucks.

Another object of the invention is to provide a chuck of the above character which will hold a work piece to be rotatively driven without slipping or tearing the shank portion of the same during use irrespective of the hardness characteristics of the work piece.

A further object is to provide a chuck operable without the use of such adjuncts as tightening and loosening keys and the like.

Another object is to provide a chuck adapted to operate various work tools provided with different sized shank portions.

A still further object is to provide a chuck which automatically centers the work piece into the desired axial alignment with reference to the axis of the chuck when gripping the work piece.

Another object is to provide a chuck which is efficient in operation, which has few wearing parts, each formed and conditioned so as to reduce wear to a minimum, and which chuck readily releases the work member when desired in response to a simple manual operation.

Other objects, features and advantages will become apparent from the following description and appended claims.

For the purpose of illustrating the genus of the invention, two embodiments are disclosed in the accompanying drawings, in which:

Fig. 1 is an exploded view, generally in central longitudinal section of a chuck constructed in accordance with the invention.

Fig. 2 is an assembly view in central longitudinal section of the parts shown in Fig. 1; the section being taken on a plane at an angle of 90 degrees with respect to the reference plane of Fig. 1.

Fig. 3 is a sectional view similar to Fig. 2 taken on the line 3—3 of Fig. 2 and with reference to the same section plane as in the case of Fig. 1.

Fig. 4 is a transverse section taken on the line 4—4 of Fig. 2.

Fig. 5 is a view similar to Fig. 1 of another embodiment of this invention.

Fig. 6 is an assembly view part in elevation and part in section of the embodiment of the invention disclosed in Fig. 5.

Fig. 7 is a transverse section taken on the lines 7—7 of Fig. 6.

Referring to the drawings and more especially to Figs. 1 to 4 inclusive, the numeral 10 designates a driving member provided with an axial and tapered bore 11 for receiving the driving element indicated at 28 in Figs. 2 and 3. The driving member 10 is adapted to operate axially a core member 12 with reference to a sleeve member 14 which is journaled for rotation upon the driving member 10 by means of a bearing 18 and nut 17, the latter being threaded into the upper end of the sleeve member 14. The bearing 18 and nut 17, however, prevent axial relative movement between the driving member 10 and the sleeve member 14. A pin 13 fixed to the sleeve member 14 is adapted to engage a relatively steep pitch slot 22 provided in the periphery of the core member 12. In effect, the pin 13 and slot 22 form a part turn right hand thread connection between the core member 12 and the sleeve member 14. A plurality of tapered rollers 15 are disposed in suitable axially directed slots provided at the outer end of the core member 12. A cam bushing 16 is adapted to be pressed into the sleeve member 14 until a shoulder 25 on element 16 engages the shoulder 26 formed on the sleeve member 14. The cam bushing 16 is provided with cam surfaces 19 which taper inwardly generally toward the outer end of the cam bushing and which cam surfaces 19 extend radially inwardly to the maximum extent at the central portion of each cam surface.

The driving member 10 is provided with an axially directed and left hand threaded central bore 20 adapted threadedly to receive the left hand threaded portion 21 provided at the inner end of the core member 12. Rotation of the driving member 10 in a clockwise direction as viewed from the top of Figs. 1, 2 and 3 as viewed directly in Fig. 4 will cause the core member 12 to move axially outwardly and force the tapered rollers 15 into contact with the interior surface of the cam bushing 16, the nut 17 and ball bearing 18 holding the sleeve 14 against axial movement with respect to the driving member 10. If the sleeve 14 is held against rotation, the tapered rollers 15 will be brought into engagement with the cam surface 19 and urged thereby in radially inward directions so as to grip a work piece W which is to be rotated in a clockwise direction. It is noted, however, that the pin 13, fixed to the sleeve member 14 and engaging the cam slot 22 causes a slight counterclockwise rotation of the core member 12 and tends to ease the engagement of the tapered rollers with respect to the work piece W. The axially outward movement of the core member 12 is limited by means of lugs 23 on core member 12 when they engage the shoulder 24 provided on the cam bushing 16. The lugs 23 would engage the shoulder 24 only if the work piece were too small to be gripped by the rollers 15. The numeral 27 indicates an oil or lubricant packing mounted around the driving member 10. It will be noted that when a work piece W is rotated in a clockwise direction, that the more the reaction exerted upon the chuck by the work piece, the tighter the tapered rollers 15 will be engaged with the work piece.

In practice, the work piece W is inserted into the chuck when the driving element 28 is stationary and the sleeve member 14 is rotated in a counterclockwise direction until the tapered rollers 15 engage the shank of the work piece W. This places the chuck and work piece in condition for operation. When the desired operations have been completed and the driving element 28 is again in a stationary condition rotation of the sleeve member 14 in a clockwise direction will cause the core member 12 to thread into the driving member 10 and release the rollers 15 from the work piece, the pin 13 and slot 22 freeing the threads 20 and 21 to permit easy release of the work piece W.

By virtue of the above described clutch mechanism, a chuck is produced which requires no keys or similar devices to tighten or loosen the gripping jaws with respect to the work piece to be rotated. The cam surfaces 19 and the upwardly axial movement of the core member 12 both cause the rollers 15 to effect a gripping action on the work piece W which makes the chuck self-energizing in its action. The more the resistance to rotation offered by the work piece W, the tighter it will be gripped by the rollers 15. The cam surfaces 19 and rollers 15 axially align the work piece with reference to the chuck during such gripping action. This eliminates any possibility of slipage and, as the roller members or jaws 15 have a rolling action, tearing or distortion of the shank of the work piece W is practically impossible. It is also noted that outward axial movement of the core member 12 is effected by slight pitched threads 20 and 21 of the core member 12 and of driving member 10 while shallow pitch cam surfaces 19 cause radially inwardly directed movement of the roller jaws 15 so that gripping action of the latter will be very effective even when the shank of the work piece to be driven has high hardness characteristics.

Referring to Figs. 5, 6 and 7, in this modification, the numeral 100 indicates an essentially tubular driving member threaded as indicated at 110 for the reception of a driving element 280 in the form of a hollow spindle. The right hand threaded portion 200 is provided on the driving member 100 and cooperates with threads 200 provided upon the interior of the sleeve member 140. In this embodiment the core member 120 is not threaded to the driving member 100 but journaled for rotation with respect to the latter by means of a bearing 180. The core member 120 does not move axially with reference to the driving member 200. The sleeve member 140, rather, does move axially with reference to the driving member 100 through the intermediary of threaded portions 200 and 210 upon rotation of the sleeve member 140 with respect to the driving member 100. The pin 130 is fixed to the sleeve 140 and engages a cam slot 220 as in the previously described embodiment. The core member 120 is also provided with a plurality of slots as before for the reception of tapered rollers 150 and the sleeve member 140 is provided with operating cam surfaces 19 as hereinbefore described with reference to the embodiment of the invention disclosed in Figs. 1 to 4 inclusive. Rotation of the sleeve member 140 in a clockwise direction as viewed in Fig. 7 with reference to a stationary driving member 100 causes the sleeve member 140 to thread onto the driving member 100 so that cam surfaces 19 urge the roller jaws 150 radially inwardly to grip the work piece W. Clockwise rotation of the sleeve 140 relative to the driving member 100 urges the sleeve member 140 axially outwardly with reference to the driving member 100 and allows release of the work piece W. A plug member 29 is disposed within the core member 120 and is provided with an annular shoulder flange 30 disposable between the end of the spindle 280 and the inner end of core member 120 so that the end of a plug member 29 opposite the shoulder portion 30 can be used to limit the extent to which the work piece W can be inserted into the chuck. This removes the possibility of the work piece being accidentally projected directly through the chuck into the hollow interior of the spindle 280.

As many changes could be made in the above described constructions, and many apparently widely different embodiments of this invention could be had without departing from the scope thereof, it is intended that all matter contained in the above description and shown in the accompanying drawings shall be interpreted as illustrative and not in a limiting sense.

I claim:

1. In a chuck including a driving member, a core member and a sleeve member arranged in axially concentric relationship, said sleeve member including a tapered bore provided with a cam surface eccentric with respect to the axis of the chuck, the combination of means carried by said core member and operable by the cam surface in said sleeve member for engaging a work piece, said driving member and one of said other members being provided with a threaded connection for effecting operation of said means, and means having an effective pitch other than that of said threaded connection and connecting said sleeve and core members for effecting operation of said first-named means.

2. In a chuck including a driving member, a core member and a sleeve member arranged in axially concentric relationship, said sleeve member including a tapered bore provided with cam surfaces eccentric with respect to the axis of the chuck, the combination of means carried by said core member and operable by said cams for engaging a work piece, said driving member and one of said other members being provided with a threaded connection for effecting relative axial movement between said core member and said sleeve member, and a slot and pin connection between said sleeve member and said core member for effecting operation of said first-named means.

3. In a self-energizing keyless chuck including a driving member, a core member and a sleeve member arranged in axially concentric relationship, said sleeve member including a tapered bore provided with cam surfaces eccentric with respect to the axis of the chuck, the combination of means carried by said core member and operable by said cams for engaging a work piece, said driving member and one of said other members being provided with a threaded connection for effecting relative axial movement between said core member and said sleeve member, and a slot and pin connection between said sleeve member and said core member having an effective pitch other than that of said threaded connection for effecting operation of said first-named means.

4. In a self-energizing keyless chuck including a driving member, a core member, and a sleeve member arranged in axially concentric relationship, said sleeve member including a tapered bore provided with cam surfaces eccentric with respect to the axis of the chuck, the combination of means carried by said core member and operable by said cams for engaging a work piece, said driving member and said core member being provided with a threaded connection for effecting relative axial movement between said core member and said sleeve member, and slot and pin connection between said sleeve member and said core member having an effective pitch other than that of said threaded connection and of opposite hand with respect to that of said threaded connection for effecting operation of said first-named means.

5. In a self-energizing keyless chuck including a driving member, a core member and a sleeve member arranged in axially concentric relationship, said sleeve member including a tapered bore provided with cam surfaces eccentric with respect to the axis of the chuck, the combination of tapered rollers carried by said core member and operable by said cams for gripping a work piece, said driving member and said core member being provided with a left hand threaded connection for effecting relative axial movement between said core member and said sleeve member, and a slot and pin connection of right hand and greater effective pitch with respect to that of said threaded connection for engaging and releasing said gripping rollers with respect to the work piece upon rotation of the sleeve with respect to said driving member.

6. In a self-energizing keyless chuck including a driving member, a core member and a sleeve member arranged in axially concentric relationship, said sleeve member including a tapered bore provided with cam surfaces eccentric with respect to the axis of the chuck, said sleeve member being journaled on said driving member for rotation without relative axial movement with respect to the driving member, the combination with tapered rollers carried by said core member and operable by said cams for gripping a work piece, said driving member and said core member being provided with a left hand threaded connection for effecting relative axial movement between said core member and said sleeve member, and a slot and pin connection of right hand and greater effective pitch with respect to that of said threaded connection for engaging and releasing said gripping rollers with respect to the work piece upon rotation of the sleeve with respect to said driving member.

7. In a self-energizing keyless chuck including a driving member, a core member and a sleeve member arranged in axially concentric relationship, said sleeve member including a tapered bore provided with cam surfaces eccentric with respect to the axis of the chuck, the combination of means carried by said core member and operable by said cams for gripping a work piece, said driving member and said sleeve member being provided with a threaded connection for effecting relative axial movement therebetween upon relative rotation thereof, said core member being journaled for rotation without relative axial movement in said driving member, and means having an effective pitch other than said threaded connection and connecting said sleeve member and said core member for effecting operation of said first-named means.

8. In a self-energizing keyless chuck including a driving member, a core member and a sleeve member arranged in axially concentric relationship, said sleeve member including a tapered bore provided with cam surfaces eccentric with respect to the axis of the chuck, the combination of means carried by said core member and operable by said cams for gripping a work piece, said driving member and said sleeve member being provided with a threaded connection for effecting relative axial movement therebetween upon relative rotation thereof, said core member being journaled for rotation without relative axial movement in said driving member, and a cam and slot connection of the same hand as that of said threaded connection connecting said sleeve member and said core member for effecting operation of said first-named means.

9. In a self-energizing keyless chuck including a driving member, a core member and a sleeve member arranged in axially concentric relationship, said sleeve member including a tapered bore provided with cam surfaces eccentric with respect to the axis of the chuck, the combination of tapered rollers carried by said core member and operable by said cams for gripping a work piece, said driving member and said sleeve member being provided with a threaded connection for effecting relative axial movement therebetween upon relative rotation thereof, said core member being journaled for rotation without relative axial movement in said driving member, and a cam and slot connection of the same hand as that of said threaded connection connecting said sleeve member and said core member for effecting operation of said gripping rollers for engaging and releasing said gripping rollers with respect to the work piece upon rotation of the sleeve with respect to said driving member.

10. In a self-energizing keyless chuck including a driving member, a core member and a sleeve member arranged in axially concentric relationship, said sleeve member including a tapered bore provided with cam surfaces eccentric with respect to the axis of the chuck, the combination of tapered rollers carried by said core member and operable by said cams for gripping a work piece, said driving member and said sleeve member being provided with a right hand threaded connection for effecting axial movement of said sleeve relative to said core member, and a pin and slot connection of the same hand as that of said threaded connection and of greater effective pitch with respect to that of said threaded connection for engaging and releasing said gripping rollers with respect to the work piece upon rotation of the sleeve member with respect to said driving member.

11. In a self-energizing keyless chuck including a driving member, a core member and a sleeve member arranged in axially concentric relationship, said sleeve member including a tapered bore provided with cam surfaces eccentric with respect to the axis of the chuck, the combination of tapered rollers carried by said core member and operable by said cams for gripping a work piece, said driving member and said sleeve member being provided with a right hand threaded connection for effecting relative axial movement between said core member and said sleeve member, a slot and pin connection of right hand and greater effective pitch with respect to that of said threaded connection for effecting engagement and release of gripping rollers with respect to the work piece upon rotation of the sleeve member with respect to said driving member, and a plug member disposed in said core member for limiting the extent to which the work piece can be inserted in the chuck.

ARTHUR I. KIRKLAND.